United States Patent [19]

Labarile

[11] Patent Number: 4,658,923

[45] Date of Patent: Apr. 21, 1987

[54] APPARATUS FOR STABILIZING A LOAD CELL

[75] Inventor: Paul Labarile, Pittsburg, Calif.

[73] Assignee: Campbell Design Group, Pacheco, Calif.

[21] Appl. No.: 660,847

[22] Filed: Oct. 15, 1984

[51] Int. Cl.⁴ .......................................... G01G 21/02
[52] U.S. Cl. ................................................ 177/255
[58] Field of Search .......................................... 177/255

[56] References Cited

U.S. PATENT DOCUMENTS

| | | | |
|---|---|---|---|
| 553,978 | 2/1896 | Edminster | 177/255 |
| 3,999,621 | 12/1976 | Wagner | 177/255 X |
| 4,261,428 | 4/1981 | Bradley | 177/255 X |
| 4,339,010 | 7/1982 | Malikov et al. | 177/255 X |
| 4,463,816 | 8/1984 | MacFarlane | 177/255 X |
| 4,483,404 | 11/1984 | Weihs | 177/255 |

Primary Examiner—George H. Miller, Jr.
Attorney, Agent, or Firm—Bielen and Peterson

[57] ABSTRACT

An apparatus for stabilizing a load cell which may be used for a security floor plate connected to the load cell in cooperation with a platform. The apparatus utilizes an arm supported by the platform and fixed to the floor plate. A pedestal is also included which is supported from the platform and supports the load cell and connected floor plate above the platform. Lateral movement between the pedestal and the supported load cell is limited without inhibiting vertical movements of the load cell and connected floor plate.

6 Claims, 3 Drawing Figures

APPARATUS FOR STABILIZING A LOAD CELL

BACKGROUND OF THE INVENTION

The present invention relates to a novel apparatus for stabilizing a load cell which may be used in security applications.

Maintaining security of a facility is often accomplished by restricting access to the security area through specific points of entry. In many areas these points of entry have been automated to increase security and to save expenditures of labor. In certain situations points of entry to a security enclosure are exposed to the elements, being outside the security edifice. Security enclosures have been used in the out-of-doors type of security entrance and have included floor plates which detect the presence of a body thereat. Also, security enclosures of this type have included sides and roofs to protect the detecting equipment which is often electronic in nature. Security enclosures are often subjected to forces which unintentionally activate the sensing devices heretofore described, such as those originating from the wind, domesticated animals and the like. Preventing the activation of a load cell, in particular, which is normally connected to a suspended floor plate is a problem which has not been solved adequately in the prior art. Provision of such a solution would be a great advance in the field of automated security equipment.

SUMMARY OF THE INVENTION

In accordance with the present invention a novel and useful apparatus for stabilizing a load cell and connected floor plate supported above a platform is provided.

The apparatus of the present invention employs an arm which lies adjacent to and obtains support from the platform and lies beneath the elevated floor plate. The arm includes a portion and is fixed to the floor plate and may take the form of an edge portion having a lateral dimension. The arm may also rest directly or indirectly on the platform or be fixed thereto.

The present invention also includes a pedestal which obtains support from the underlying platform and supports the load cell in a connected floor plate thereabove. Where the arm rests directly on the platform such pedestal may lie intermediate the rested arm and the load cell itself.

Means is also provided for limiting lateral movement between the pedestal and the supported load cell which is connected to the floor plate. Such limiting means may take the form of a boss which is fixed to the platform and connected to the floor plate. The connection between the boss and the floor plate may be a resilient connection. However, the floor plate may move vertically in relation to the boss so as not above interfere with the operation of the load cell. The boss may extend to the floor plate and include a stop to prevent disconnection of the boss and the floor plate.

It may be apparent that a novel and useful apparatus for stabilizing a load cell in conjunction with a security structure has been described.

It is therefore an object of the present invention to provide an apparatus for stabilizing a load cell which is usable in an outdoor environment subjected to extraneous forces.

It is another object of the present invention to provide an apparatus for stabilizing a load cell which is relatively easy to manufacture and install.

Another object of the present invention is to provide an apparatus for stabilizing a load cell which is usable with existing security detection and metering devices.

The invention possesses other objects and advantages especially as concerns particular characteristics and features thereof which will become apparent as the specification continues.

Figure 1:
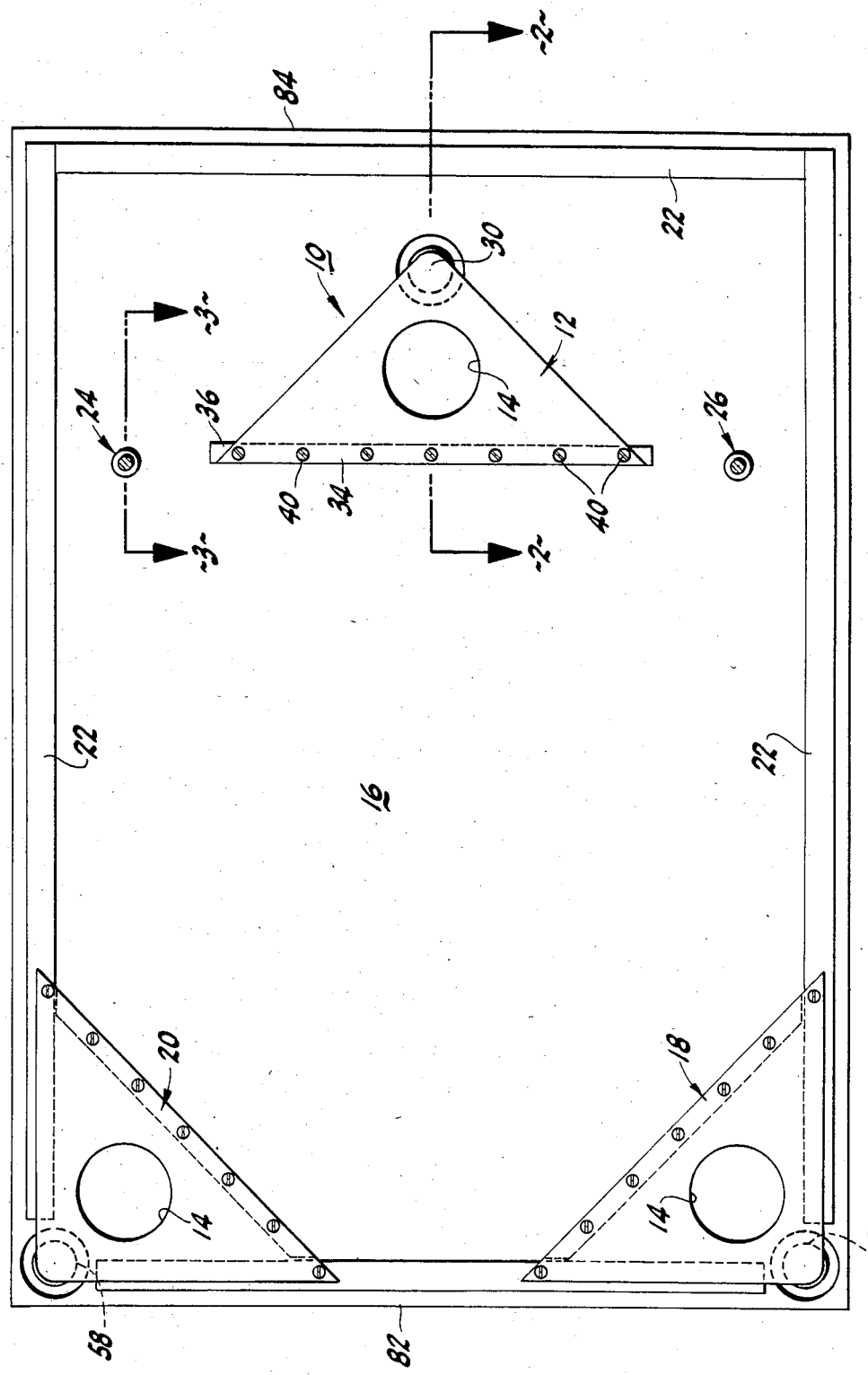
FIG. 1 is a bottom plan view of a floor plate used in conjunction with the present invention in a security enclosure.

For a better understanding of the invention reference is made to the hereinafter description of the preferred embodiments thereof which should be taken in conjunction with the hereinabove described drawings.

DESCRIPTION OF THE PREFERRED EMBODIMENTS

Various aspects of the preferred embodiments will evolve from the following detailed description which should be referenced to the prior discussed drawings.

The invention as a whole is noted in the drawings by reference character 10. The apparatus 10 includes as one of its elements an arm 12 which may be in the form of a roughly triangular shaped plate having an opening 14 which lightens plate 12 without reducing its strength characteristics.

FIG. 1 depicts a floor plate 16 which includes a trio of arms or stay plates, 12, 18, and 20. The drawings depict the construction of stay plate 12 in detail and it should be understood that the same apparatus 10 as shown in conjunction with stay plate 12 applies to stay plates 18 and 20. Floor plate 16 includes a reinforcing perimeter 22 which adds rigidity to floor plate 16. Also, depicted in FIG. 1 are a pair of anchor bolts 24 and 26 having a substantially identical structure and their function will be described hereinafter.

Figure 2:
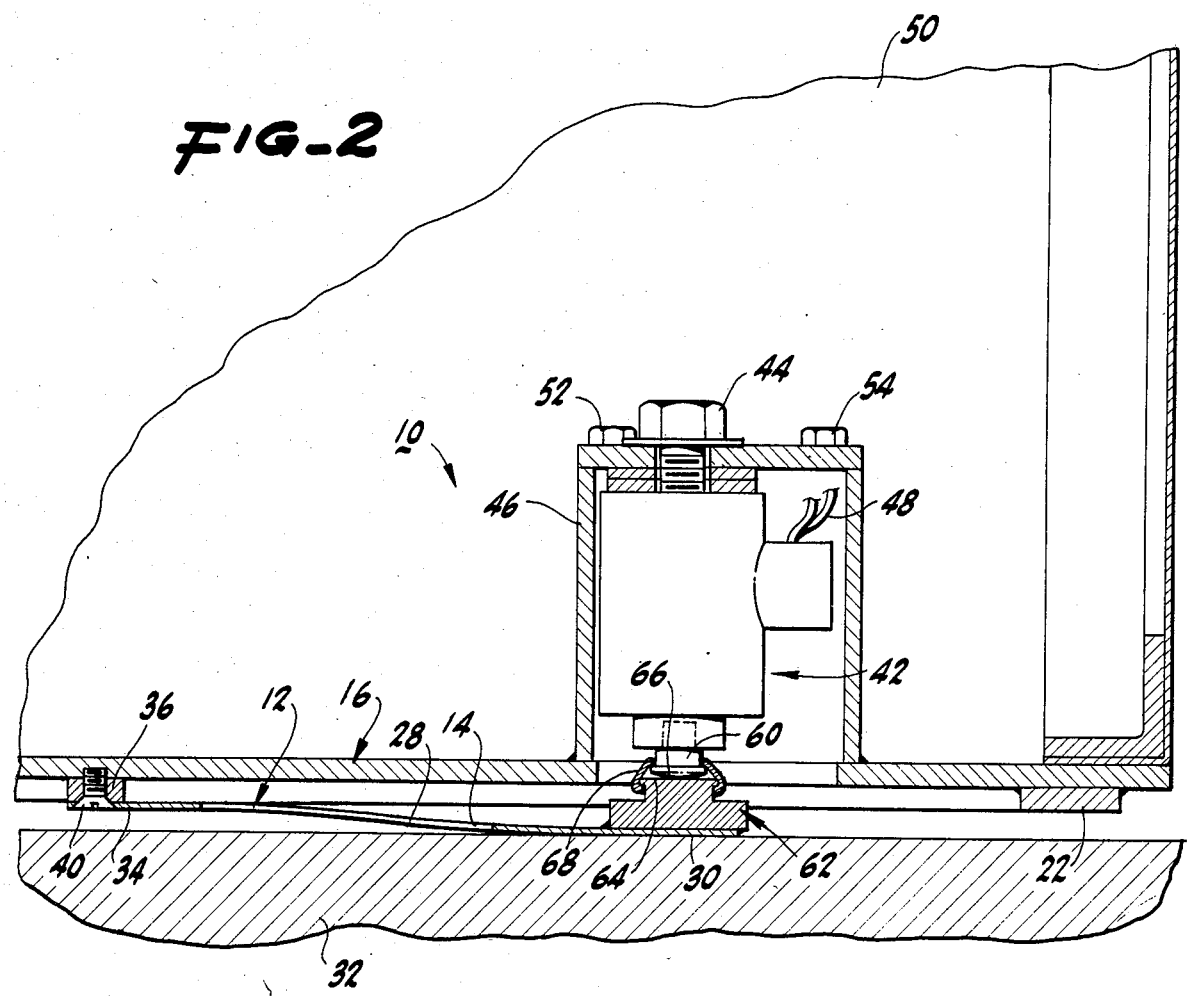
FIG. 2 is a view taken along line 2—2.
Figure 3:
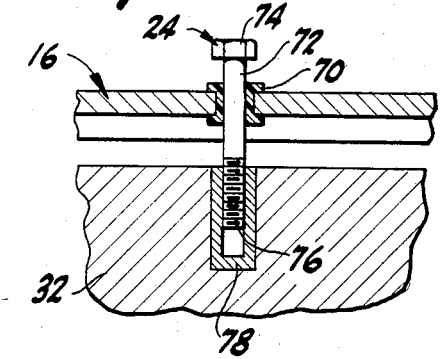
FIG. 3 is a view taken along line 3—3 of FIG. 1.

Turning to FIG. 2, arm 12 is formed in the shape of a triangular plate 28 whose apex 30 rests on platform 32. Platform 32 could be a concrete structure as depicted in FIG. 3. Edge portion 34 of triangular plate 28 is fixed to a ridge 36 on the undersurface 38 of floor plate 16 by fastening means 40.

A load cell 42 is found in the present apparatus and is employed to detect a force which may be exerted downwardly on floor plate 16. For example the series 400 load or weigh cell manufactured by Tedea Inc. of Conoga Park, California would suffice in this respect. Threaded bolt 44 holds load cell 42 to housing 46 which is welded or otherwise fastened to floor plate 16. Electrical lead wires 48 transmit the electrical signals produced by load cell 42. Platform 16 may also include a super structure 50 which may be in the form of a security booth. Bolts 52 and 54 may extend to floor plate 16 in substitution for welding of housing 42 thereto. It should be noted that load cells 56 and 58 may also be employed in conjunction with stay plates 18 and 20. An electronic array may be provided in which the majority of the load cells detect a force to effectuate an alarm, rather than any single load cell, FIG. 1.

Load cell 42 terminates in a button 60 which supports the load cell in an upright position and serves as a portion of the transducing mechanism thereof. Button 60 rests on a pedestal 62 which sits on apex 30 of plate 12, thus obtaining support from platform 32. The upper surface 64 of pedestal 62 and the lower portion 66 of button 60 are covered by a boot 68. Thus, an tipping forces exerted on superstructure 50 are strongly resisted by apparatus 10 as described.

With reference to FIG. 3, anchor bolt 24 extending through floor plate 16 includes a plastic insert 70 which permits relative movements between the shaft 72 of bolt 24 and floor plate 16. Head 74 serves as a stop as for the upward movement of floor plate 16. Threaded portion 76 of bolt 24 fastens to platform 32 by the use of a concrete insert 78. Thus, structure shown in FIG. 3 serves as means for limiting the lateral movement of floor plate 16; the connection between bolt or boss 24 being cushioned by plastic insert 70.

In operation load cells 42, 56 and 58 are placed on floor plate 16 and fastened in conjunction with stay plates 12, 18 and 20, as shown with reference to load cell 42 in FIG. 2. Bosses or anchor bolts 24 and 26 are also placed through floor plate 16 and into concrete platform 32 generally along the axis of edge portion 34 of plate 28, as shown in FIG. 1. Superstructure 50 may be used in conjunction with floor plate 16 at this point. After electrical connection of load cells 42, 56, and 58 to the appropriate detecting means, a security enclosure is now provided for use. A fence or other structure may extend from side portions 82 and 84 of platform 16 and super structure 50 to funnel traffic through the security enclosure formed by floor plate 16 and super structure 50. Extraneous forces which may be exerted on floor plate 16 and super structure 50 by the elements and the like will not activate load cells 42, 56 and 58. Thus, a direct force must be applied to floor plate 16, such as that of a person stepping on to the same.

While in the foregoing embodiments of the present invention of the present invention have been set forth in considerable detail for the purposes of making a complete disclosure of the invention, it may be apparent to those of skill in the art that numerous changes may be made in such detail without departing from the spirit and principles of the invention.

What is claimed is:

1. An apparatus for stabilizing a load cell and a connected floor plate above a platform, said floor plate including an attached superstructure, comprising:
    a. an arm lying adjacent to and obtaining support from the platform, said arm having a portion fixed to the floor plate, said arm including an edge portion fixed to the floor plate along a transverse dimension of the floor plate, said arm possessing sufficient strength characteristics to prevent downward movement of the floor plate resulting from a tipping force on the superstructure, said arm permitting direct forces on the floor plate to activate the load cell;
    b. a pedestal obtaining support from the platform, said pedestal supporting the load cell and connected floor plate above the platform;
    c. means for limiting lateral movement between said pedestal and the supported load cell connected to the floor plate.

2. The apparatus of claim 1 in which said arm rests directly on the platform and said pedestal lies intermediate said arm and the load cell.

3. The apparatus of claim 2 in which said means for limiting lateral movement between said pedestal and the supported load cell includes a boss fixed to the platform and connected to the floor plate for limiting lateral movement thereof.

4. The apparatus of claim 3 in which said boss and the floor plate connection permits vertical movement therebetween.

5. The apparatus of claim 4 in which said boss extends through the floor plate and includes a stop to prevent disconnection of said boss and the floor plate.

6. The apparatus of claim 4 which further comprises means for cushioning said connection between said boss and the floor plate.

* * * * *